United States Patent [19]
White et al.

[11] Patent Number: 5,437,165
[45] Date of Patent: Aug. 1, 1995

[54] FOOD ORGANIZER INSERT FOR PORTABLE ICE CHEST

[76] Inventors: Richard W. White, 3006 French Ave., Lake Worth, Fla. 33461; Robert J. White, 340½ Princeton Ave., Lake Worth, Fla. 33460

[21] Appl. No.: 119,569

[22] Filed: Sep. 13, 1993

[51] Int. Cl.⁶ .............................................. F25D 25/00
[52] U.S. Cl. ...................... 62/465; 62/457.1; 62/457.7
[58] Field of Search ............ 312/138.1, 116, 117, 312/293.2, 902; 62/371, 457.1, 457.5, 457.7, 457.2, 464, 465

[56] References Cited

U.S. PATENT DOCUMENTS

| | | | |
|---|---|---|---|
| 1,688,125 | 10/1928 | Megeath | 62/457.7 |
| 2,787,891 | 4/1957 | Hengehold | 62/371 |
| 3,791,547 | 2/1974 | Branscum | 62/371 |
| 4,286,440 | 9/1981 | Taylor | 62/457.7 |
| 4,347,713 | 9/1982 | Morrison et al. | 62/464 |
| 4,424,687 | 1/1984 | Morgan | 62/457 |
| 4,515,421 | 5/1985 | Steffes | 312/214 |
| 4,910,975 | 3/1990 | Derby | 62/457.1 |
| 4,916,923 | 4/1990 | Adams | 62/457.5 |
| 5,052,184 | 10/1991 | Jarvis | 62/465 |
| 5,307,647 | 5/1994 | McClure | 62/457.2 |

*Primary Examiner*—Richard A. Bertsch
*Assistant Examiner*—William Wicker
*Attorney, Agent, or Firm*—Alvin S. Blum

[57] ABSTRACT

A food organizing and protecting insert provides a horizontal shelf with food receptacle receiving apertures which mounts in a portable ice chest. The shelf occludes the upper region of the inner liner of the chest forming a closed chamber to hold ice when the chest lid is open. The food receptacles are held by their upper rims in the apertures so that the body of each receptacle is within the cooled chamber. One or more hinged transparent covers, when closed, cover the receptacles, leaving a space above the receptacle for clearance of a serving utensil while permitting viewing of the contents of the receptacles. Downwardly extending support members hold the shelf fixed position parallel to the bottom of the chest. A closable hatch in the shelf may optionally be provided and the shelf may be transparent to permit selection and retrieval of items such as beverage containers stored with the ice chamber. The insert converts an ice chest into a sanitary and convenient food storage and dispensing device for picnics, street vendors and restaurants.

12 Claims, 2 Drawing Sheets

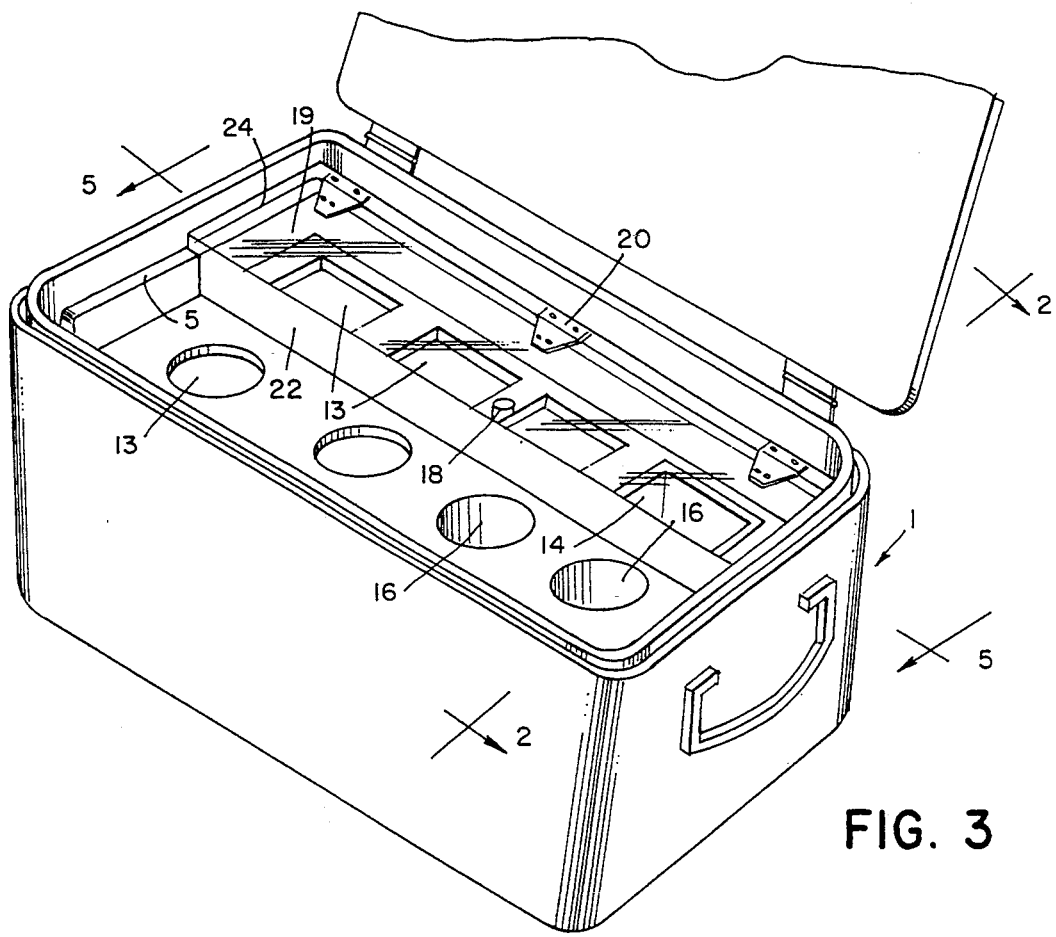
FIG. 3
FIG. 4
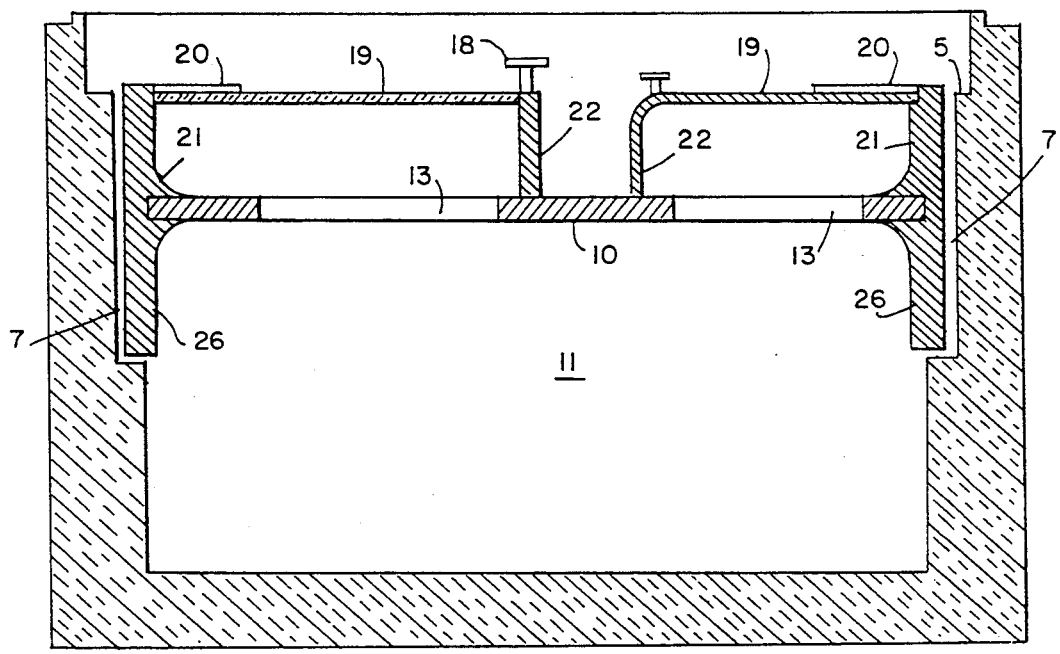

FOOD ORGANIZER INSERT FOR PORTABLE ICE CHEST

BACKGROUND OF THE INVENTION

This invention relates to coolers or ice chests, and, more particularly, to an insert for a portable cooler which holds food containers in an organized fashion for simultaneous cooling and access while the cooler top is opens which allows the food containers to be covered by a hinged lid.

U.S. Pat. No. 4,424,687 issued Jan. 1, 1984 to Morgan describes a pair of ice racks with legs for standing in an ice chest. The racks are perforated to permit melting ice to pass over the contents such as fish to maintain very low temperature with the melt accumulating below the rack out of touch with the food.

U.S. Pat. No. 4,515,421 issued May 7, 1985 to Steffes describes a shelf for a cooler which may be supported horizontally by the cooler handle outside the cooler or vertically within the cooler as a separator between compartments.

There are situations wherein it is desirable to maintain a low temperature for a number of different food items while providing ready access thereto. At a picnic, for example, one may have various salads and condiments which should be kept cold and yet be freely available to the participants. If covered containers are kept in a cooler, one cannot expect each person to remove the container, find a clean spoon, help himself, store the spoon, cover the container and return it to the cooler. By late afternoon, some of the foods may have been kept warm enough long enough to be a source of food poisoning. And street vendors may have an assortment of foods and condiments which will be both unappetizing and dangerous if stored in presently available cooler conditions.

SUMMARY OF THE INVENTION

It is, accordingly, an object of the present invention to provide an insert for an ice chest which will hold a variety of food containers above the cooling ice while maintaining the containers in a stable configuration with the container bottoms exposed to the ice chamber and the container tops open for ready access while providing a transparent hinged cover to protect the container contents while the cooler lid is open. The hinged cover provides enough clearance when closed to permit a serving spoon or the like to remain in the food container. Accessory apertures in the organizer are provided to hold substantially closed containers such as ketchup and mustard bottles as well.

The insert of the invention is a substantially horizontal shelf extending across the cooler at its upper portion. The shelf is provided with large apertures for receiving the containers. At the periphery of the shelf are downwardly extending lugs. The lugs fit into recesses normally found in the vertical walls of many coolers. The lugs thereby support the shelf in the horizontal position with the containers readily accessible at the upper end of cooler when the cooler lid is open. A hinged transparent cover closes over the opened containers so that they need not be individually covered between uses and all the contents are readily visible.

These and other objects, features and advantages of the invention will become more apparent when the detailed description is studied in conjunction with the drawings.

BRIEF DESCRIPTION OF THE DRAWINGS

FIG. 3 is a perspective view of an insert of the invention in place in an ice chest.

FIG. 4 is a sectional view, as in FIG. 2 of an alternative embodiment of the invention.

DETAILED DESCRIPTION OF PREFERRED EMBODIMENTS

Figure 1:
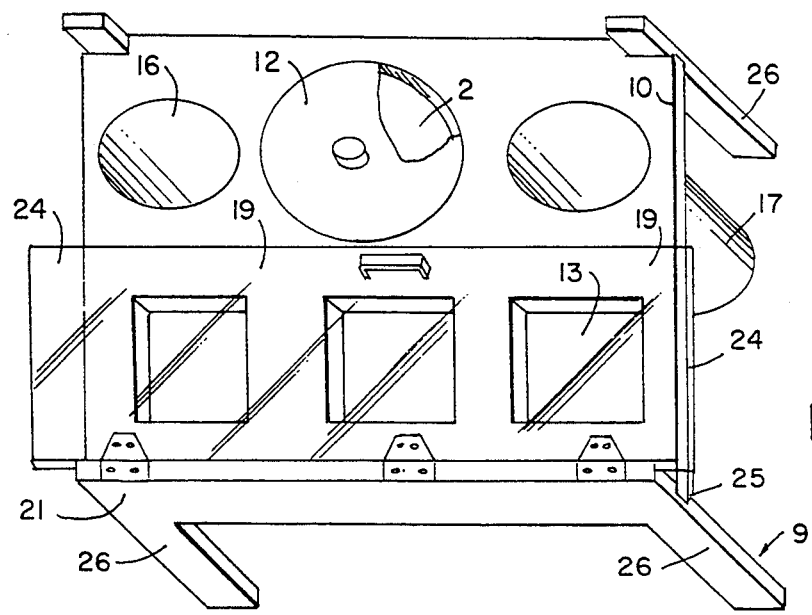
FIG. 1 is a perspective view of the insert of the invention.

Referring now first to FIGS. 1-5, a portable cooler or ice chest 1, of conventional construction, has an insulated, hinged closure, horizontal bottom 3, and vertical sides 4 extending upward from the bottom. A shoulder 5 extends around the upper portion of the molded inner liner 6 of the cooler. Some coolers are provided with recesses 7 in the vertical walls of the inner liner which extend part way down to the bottom 3. The insert 9 of the invention comprises a planar shelf 10 which is supported at the upper portion of the liner, below the shoulder 5 and parallel to the bottom 3. It is of such a shape and dimension that it substantially occludes the ice chamber 11 at its upper portion while providing a large space for ice and cooled items such as beverage containers below the shelf. The shelf may be transparent and provided with a hatch opening 2 with removable lid 12 to enable a user to visually select an item, and then reach through the hatch to retrieve the cooled item. The shelf 10 is provided with a plurality of receptacle receiving apertures 13. These are arranged for receiving open top food receptacles 14, preferably of thermally conductive metal such as stainless steel with a rolled or flared upper rim or flange 15 which engages the top face of the shelf to hold the body of the receptacle below the shelf in the ice cooled chamber 11. Other apertures 16 may be provided with a secondary, molded in, compartment 17 for holding a closed container 8 that is normally hand held for use such as a mustard or soy sauce bottle 8.

One or more of the apertures 13 holding open top containers 14 are provided with one or more transparent covers 19 provided with handles 18. The cover is connected by hinge 20 to a support element 21 extending upward from shelf 10. This element, in cooperation with a downwardly extending lip 22, holds the cover well above the receptacle when the cover is closed, to provide space for a dispensing utensil 23 in the receptacle, such as a spoon or tongs. The cover 19 extends, at opposed ends 24, over the shoulder 5 on the inner liner and cooperates therewith to substantially close off the open tops of the receptacles without requiring covering each receptacle separately. This arrangement enables the device to freely display the contents of the receptacles while protected from dirt, insects, and heat in a sanitary and appetising manner, while providing prompt access to the contents with appropriate dispensing utensils in each receptacle by simply lifting the hinged cover.

This arrangement is most convenient for picnics, street vendors, and even in restaurants where these coolers may substitute for much more expensive and awkward refrigerated display cases for salad bars, sandwich shops, and the like.

Figure 2:
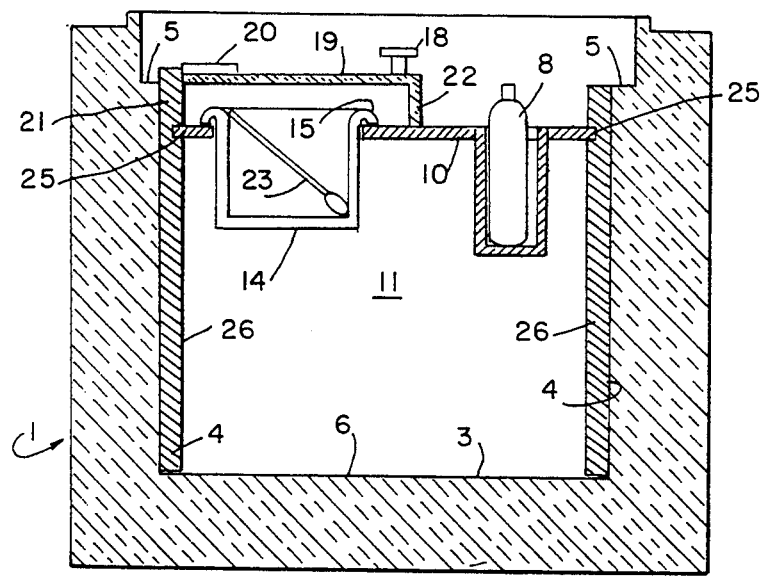
FIG. 2 is a sectional view taken through line 2—2 of FIG. 3.
Figure 5:
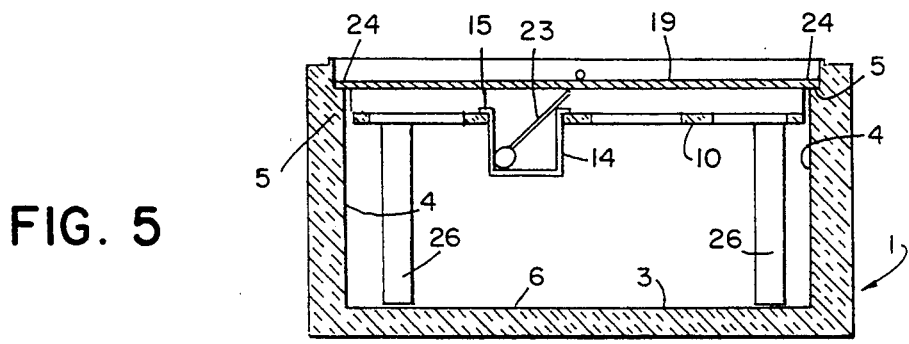
FIG. 5 is a sectional view taken through line 5—5 of FIG. 3.

The shelf 10 is removably held within the inner liner of the chest by downwardly extending support members 26 attached to the perimeter 25 of the shelf 10. These extend down to the bottom 3 of the shelf as shown in FIG. 2, or are held within the side wall recesses 7 of a chest provided with same, as shown in FIG. 4. This arrangement allows the insert to be retrofitted to many conventional coolers to convert them into a much more sanitary and useful food dispensing device.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

We claim:

1. A food organizing and protecting insert adapted to be used removably within a portable ice chest, said ice chest having an inner liner with vertical sides extending upward from a horizontal bottom and a shoulder at the upper portion of the vertical sides, said insert comprising:
    a substantially planar shelf means arranged to substantially occlude said inner liner when mounted therein parallel to said bottom;
    a plurality of receptacle receiving apertures in said shelf means, said apertures arranged for removably receiving food containing receptacles of the type which have an upper flange extending above said shelf means to thereby support said receptacles upon said shelf means;
    a plurality of downwardly extending support members attached to said shelf means at the perimeter thereof, said support members constructed for engaging said inner liner and supporting said shelf means parallel to, and above, said bottom to provide space for ice therebetween, said shelf means being supported below said shoulder; and
    at least one transparent cover hingedly connected to said perimeter of said shelf means and arranged to cover at least one of said food receiving receptacles when closed.

2. The insert according to claim 1, further comprising a plurality of thermally conductive open top receptacles, each receptacle having an upper edge provided with an outwardly extending rim or flange.

3. The insert according to claim 1, in which said at least one cover has two opposed edges which are arranged to cooperate with said shoulder to seal the space between the cover and the shelf means at the opposed edges when said cover is in closed position.

4. The insert according to claim 3, in which at least one upwardly projecting support element is connected to said shelf means at an edge thereof and said cover is hingedly connected to said at least one support element.

5. The insert according to claim 4, in which said support members are arranged to engage recesses in said vertical sides of said ice chest.

6. The insert according to claim 5, in which a space is provided between said at least one cover and said shelf means to permit clearance of a serving utensil in said receptacle, when said cover is in closed position.

7. The insert according to claim 6, in which said shelf means is transparent and provided with a closable hatch for passing a hand therethough for reaching items stored below said shelf means.

8. The insert according to claim 4, in which said support members are arranged to engage said bottom of said liner.

9. The insert according to claim 8, in which a space is provided between said at least one cover and said shelf means to permit clearance of a serving utensil in said receptacle, when said cover is in closed position.

10. The insert according to claim 9, in which said shelf means is transparent and provided with a closable hatch for passing a hand therethrough for reaching items stored below said shelf means.

11. A food organizing and protecting insert adapted to be used removably within a portable ice chest, said ice chest having an inner liner with vertical sides extending upward from a horizontal bottom and a shoulder at the upper portion of the vertical sides, said insert comprising:
    a substantially planar shelf means arranged to substantially occlude said inner liner when mounted therein parallel to said bottom;
    a plurality of thermally conductive open top receptacles, each receptacle having an upper edge provided with an outwardly extending rim;
    a plurality of receptacle receiving apertures in said shelf means, said apertures arranged for receiving said receptacles therein so that said rims rest upon said shelf meams;
    support means attached to said shelf means at the perimeter thereof, said support means for engaging said inner liner and supporting said shelf means parallel to, and above, said bottom to provide space for ice therebetween, said shelf means being supported below said shoulder; and
    at least one transparent cover hingedly connected to said perimeter of said shelf means and arranged to cover at least one of said receptacles when closed.

12. A food organizing and protecting insert adapted to be used removably within a portable ice chest, said ice chest having an inner liner with vertical sides extending upward from a horizontal bottom and a shoulder at the upper portion of the vertical sides, said insert comprising:
    a substantially planar shelf means arranged to substantially occlude said inner liner when mounted therein parallel to said bottom;
    a plurality of receptacle receiving apertures in said shelf means, said apertures constructed for removably receiving therein food containing receptacles of the type which have an upper outwardly extending rim to thereby support said receptacles by said rim upon said shelf means;
    support means attached to said shelf means at the perimeter thereof, said support means for engaging said inner liner and supporting said shelf means parallel to, and above, said bottom to provide space for ice therebetween, said shelf means being supported below said shoulder; and
    at least one transparent cover hingedly connected to said perimeter of said shelf means and arranged to cover at least one of said receptacles when closed.

* * * * *